United States Patent [19]
Getty et al.

[11] Patent Number: 5,205,697
[45] Date of Patent: Apr. 27, 1993

[54] MOBILE PASSENGER ACCESS LIFT

[75] Inventors: Paul M. Getty, Sunrise; Peter J. Driver, Miami; Caner Unsal, Plantation; William J. Wilcox, Jr., Miami, all of Fla.

[73] Assignee: Wollard Airport Equipment Company, Miami, Fla.

[21] Appl. No.: 687,804

[22] Filed: Apr. 19, 1991

[51] Int. Cl.$^5$ ............................................ B65G 67/02
[52] U.S. Cl. ................................. 414/341; 244/137.2; 414/347; 414/495; 414/537; 414/786; 414/921
[58] Field of Search ............... 414/341, 347, 495, 537, 414/921, 786; 244/137.1, 137.2

[56] References Cited

U.S. PATENT DOCUMENTS

| | | | |
|---|---|---|---|
| 2,778,674 | 1/1957 | Attendu | 244/137.2 X |
| 3,046,908 | 7/1962 | Der Yuen | 244/137.2 X |
| 3,263,832 | 8/1966 | Williams, Jr. et al. | 414/495 X |
| 3,521,775 | 7/1970 | Vermette | 414/537 X |
| 3,752,331 | 8/1973 | Colburn | 414/495 X |
| 3,806,092 | 4/1974 | Richards | 414/495 X |
| 4,081,091 | 3/1978 | Thorley | 414/921 X |
| 4,084,714 | 4/1978 | Williams | 414/537 X |
| 4,214,849 | 7/1980 | Downing | 414/921 X |
| 4,312,619 | 1/1982 | Anderson et al. | 414/495 X |
| 4,576,539 | 3/1986 | Williams | 414/921 X |
| 4,671,730 | 6/1987 | Gateau | 414/495 |
| 4,799,848 | 1/1989 | Buckley | 414/347 |
| 4,971,510 | 11/1990 | Houle | 414/537 X |
| 5,105,915 | 4/1992 | Gary | 414/921 X |

FOREIGN PATENT DOCUMENTS

| | | | |
|---|---|---|---|
| 253263 | 1/1988 | European Pat. Off. | 414/495 |
| 290966 | 11/1988 | European Pat. Off. | 414/495 |

Primary Examiner—David A. Bucci

[57] ABSTRACT

A self propelled steerable vehicle for transporting a wheelchair bound passenger between two separate locations, such as between a terminal and an aircraft parked on a ramp, includes a lift assembly mounted on said vehicle for movement from a lowermost position to an operator selectable upper position. The vehicle is provided with an operator's compartment containing steering, braking, motive and lift assembly controls. An internal combustion engine powers a hydraulic system for both moving the vehicle and powering the lift assembly. A passenger's compartment carried by said lift assembly is provided with a pair of ramps which are movable from a loading position to a traveling position. In the loading position, hand rails are automatically extended. Gas cylinders between the hand rails and the ramp assist the operator is raising the ramps. In the traveling position, the ramps act as gates for the passenger compartment. The operator's position is at the front of the vehicle, near the passenger compartment, which allows ready access to the forward ramp. Stabilizers are used when the lift assembly is in other than its lowermost position and are automatically extended prior to the lifting of the passenger compartment. The stabilizers are fully retracted prior to subsequent movement of the vehicle.

14 Claims, 11 Drawing Sheets

MOBILE PASSENGER ACCESS LIFT

BACKGROUND OF THE INVENTION

This invention relates to a vehicle designed to transport wheelchair bound passengers between two separate locations and elevations, such as between a terminal and an aircraft parked on a ramp.

Commuter and small jet aircraft and other elevated areas are difficult for disabled, handicapped or incapacitated passengers to access without some means to lift them into the door. One prior art device is an elevator mechanism that is towed into position adjacent the aircraft. This device is also provided with an adjustable staircase for use by able-bodied passengers. It is not, however, intended to be used to transport passengers from one location at a first elevation to a second location at a second elevation, nor does it approach the aircraft door directly.

SUMMARY OF THE INVENTION

The present invention is a mobile passenger access lift for transporting disabled, handicapped or incapacitated passengers from one location to another. It is particularly useful in providing boarding access to commuter and small jet aircraft and other elevated areas, such as trains and the like, to wheelchair bound passengers.

The mobile passenger access lift of the present invention is includes a) a welded tubular steel framework which supports a driver's area, a lifting structure, a passenger compartment, and motive power generating components (engine, drive components, wheels, etc.); b) the driver's area includes a seat rest, steering wheel, and foot and hand controls; c) the lifting structure includes steel channel framework, hydraulic cylinders and hydraulic safety features; d) the passenger compartment includes protective enclosure sides, entrance and exit ramps which also serve as gate closures, self-actuating handrails, skid resistant surfaces, cushioned surfaces and tie-down points for wheelchair restraints; e) the motive power generating system and controls include an internal combustion engine, hydraulic pump and reservoir, functional and control valves and hydraulic wheel motors.

The present invention enables the boarding and deplaning of passengers from elevated areas up to 78" above the ground or operating surface in a safe and dignified manner. It is self contained and self propelled, providing mobility for itself as a lifting device as well as for its occupants. The normal occupancy of the vehicle is either the driver alone, or the driver plus a passenger and an attendant, therefor providing for a maximum of three (3) persons. The vehicle may be provided with an optional canopy for passenger and attendant comfort.

The vehicle is designed to approach the aircraft doors, both front an rear, directly from the left side of the fuselage. The operator's compartment is offset to the left front of the elevating passenger compartment thus permitting excellent visual positioning.

Safety features are provided in the design of the vehicle for passenger, attendant, operator, surrounding personnel, aircraft components and the unit itself. One of those safety features is a set of stabilizers which are set in place before the passenger compartment is raised. Other safety features include interlocks to prevent movement of the vehicle under certain conditions and lighting.

Another safety feature is the manner in which the vehicle approaches an aircraft. Using the present invention, the vehicle moves directly toward the fuselage of an aircraft, parallel to the wing, and thus maintains a clear distance from the propeller area at all times.

It is therefore an object of this invention to provide an improved apparatus for transporting passengers, and particularly disabled passengers seated on a boarding wheelchair from one location to another. The invention provides for the passenger and an attendant to be moved between locations having substantially different elevations.

It is a further object of the invention to provide an improved passenger access lift that is provided with stabilizers that automatically extend when the lift is raised; and to provide stabilizers that do not lift the vehicle off the ground.

It is still another object of this invention to provide a passenger access lift that is moved between locations with an unique hydraulic drive system.

It is a further object of this invention to provide a self powered, steerable vehicle for transporting a wheelchair bound passenger from a first location to a second location at a different elevation, the vehicle comprising lift assembly means mounted on the vehicle for movement from a lowermost position to an operator selectable upper position, an operator's compartment containing steering and lift assembly controls, a passenger compartment carried by the lift assembly means, a first ramp associated with the passenger compartment, the first ramp being movable from a loading position to a traveling position, a second ramp associated with the passenger compartment, the second ramp being movable from a loading position to a traveling position, and means for stabilizing the vehicle when the lift assembly means is in other than its lowermost position.

It is still another object of this invention to provide a method of transporting a wheelchair bound passenger from a first location to an aircraft at second location comprising the steps of loading a passenger into a passenger compartment on a transport vehicle by pulling the passenger's wheelchair onto a first or loading ramp and then into the passenger compartment, raising the loading ramp to provide an end closure for the passenger compartment, moving a passenger unloading ramp directly toward the door of an aircraft and parallel to the wing of the aircraft, extending stabilizers to steady the vehicle then raising the passenger compartment to approximately the same elevation as the aircraft, lowering a second or unloading ramp into the door of the aircraft, and unloading the passenger by pulling the passenger's wheelchair from the passenger compartment and over an unloading ramp into the aircraft.

Other objects and advantages of the invention will be apparent from the following description, the accompanying drawings and the appended claims.

DESCRIPTION OF THE PREFERRED EMBODIMENT

Referring now to the drawings, and particularly to FIGS. 1-3 and 5-6 which illustrate a preferred embodiment of the invention, a mobile passenger access lift, shown generally at 10, is a three wheeled vehicle designed to carry an operator or driver 11, a passenger 12 in a boarding wheelchair 13, and an attendant 14.

Figure 1:
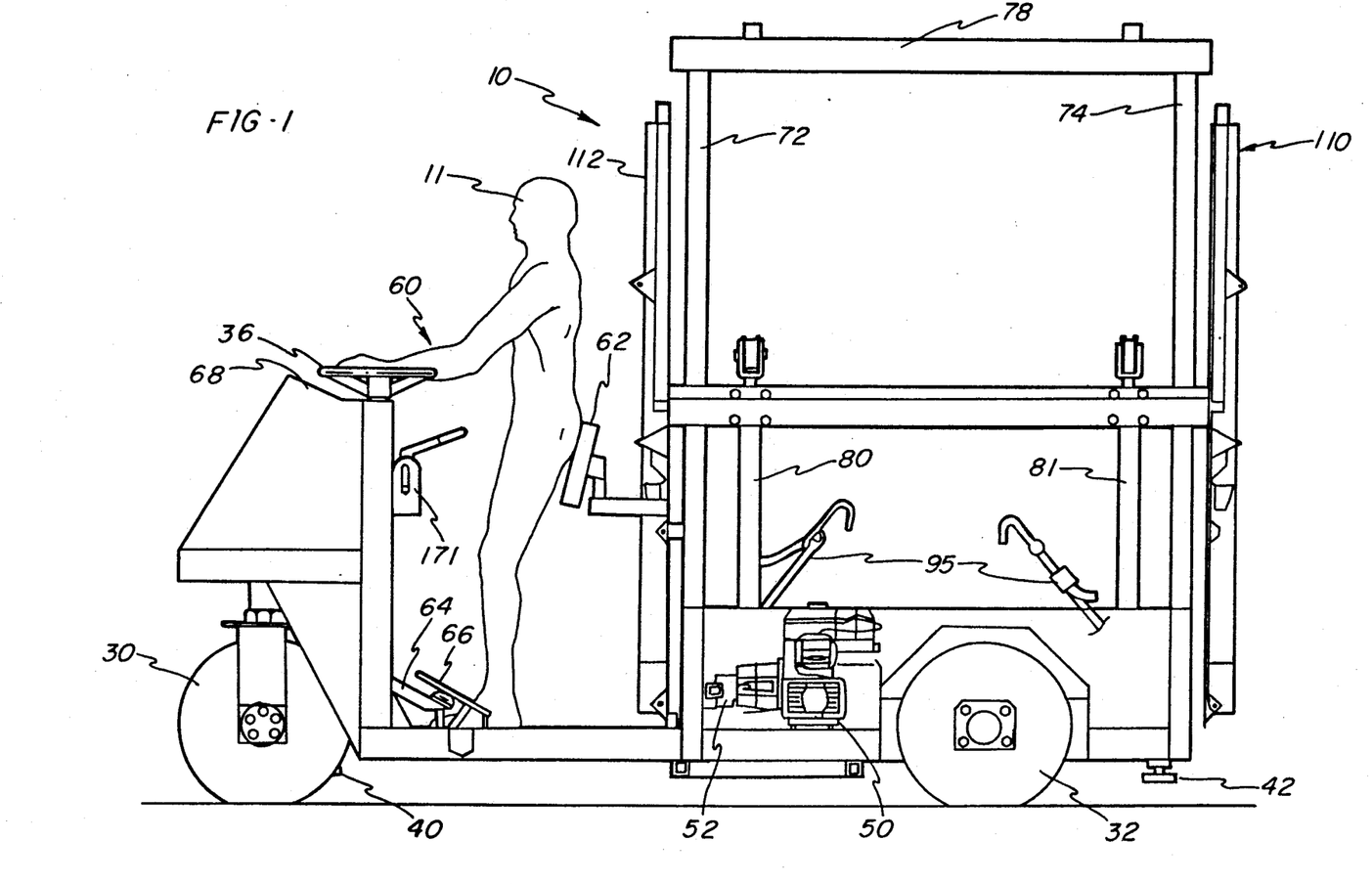
FIG. 1 is a side elevational view of a mobile passenger access lift constructed according to this invention showing the loading ramps in their closed position.
Figure 2:
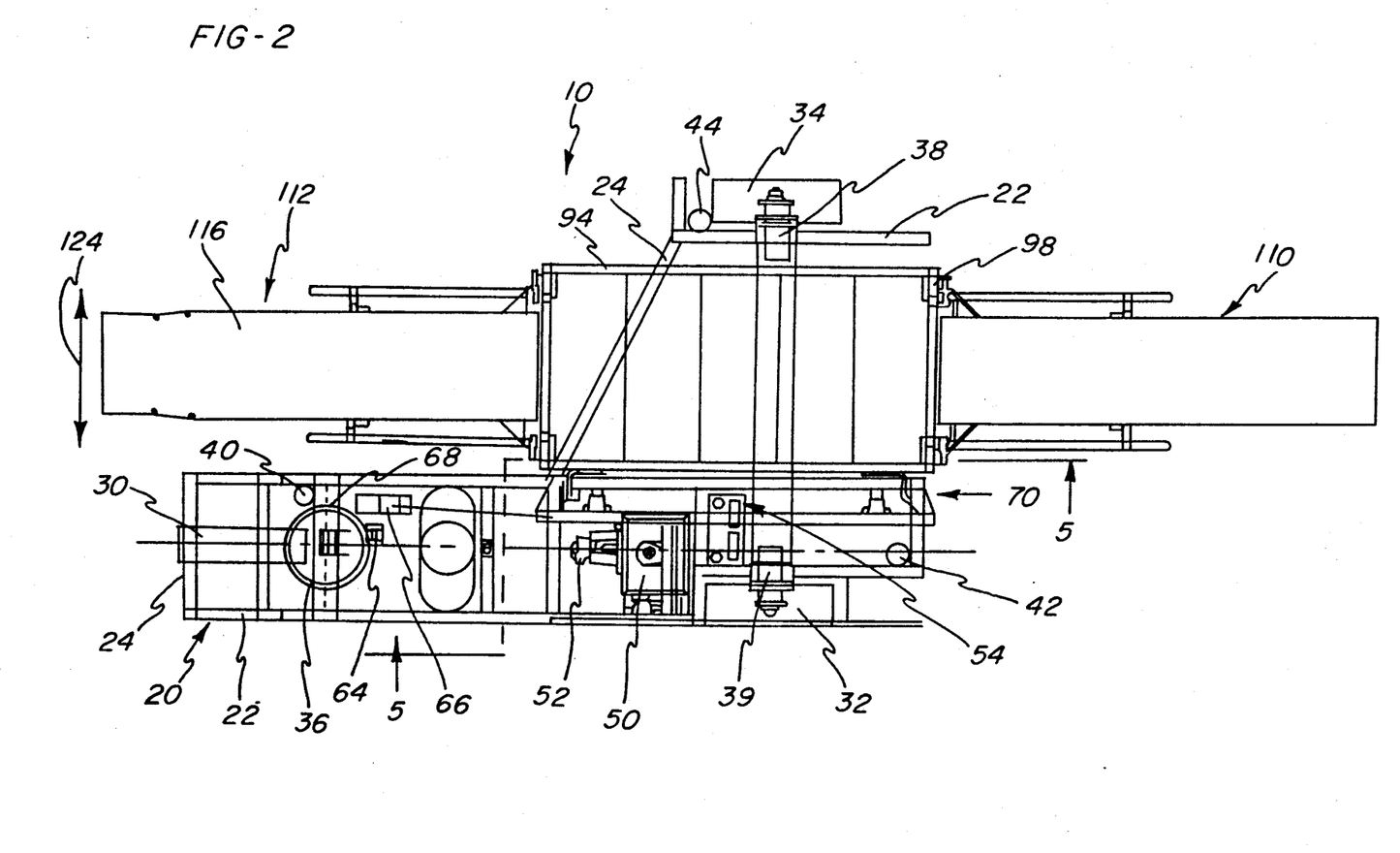
FIG. 2 is a plan view of the passenger access lift of FIG. 1 with the loading ramps in their lowered or extended position.
Figure 3:
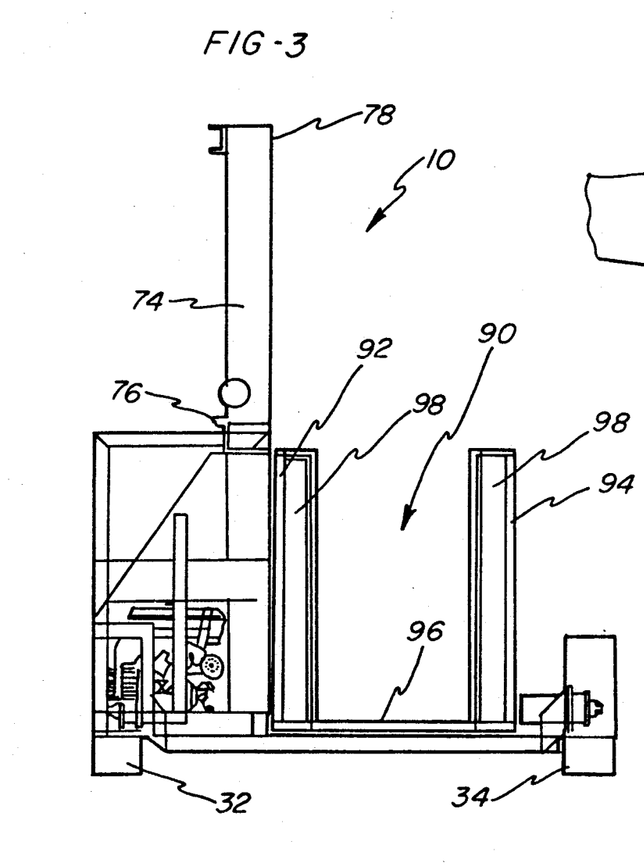
FIG. 3 is a rear end elevational of the passenger access lift with the loading ramps removed.

The vehicle is built on a welded tubular steel frame 20 that includes several longitudinally extending members 22 and transverse members 24 and a rear axle 26. Supported on the frame 20 is a steerable front wheel 30 and a pair of rear wheels 32 and 34. The front wheel is steered by a steering wheel 36. The rear wheels are driven by hydraulic motors 38.

Figure 7:
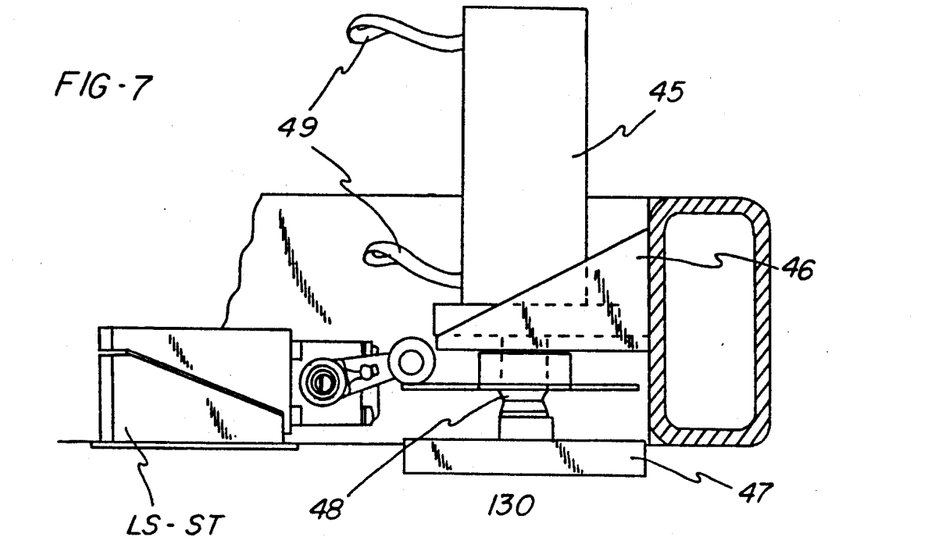
FIG. 7 is a detailed view of a stabilizer.

Also carried on the frame 20 are three stabilizers 40, 42 and 44. As shown in FIG. 7, each stabilizer cylinder 45 is attached to the frame 22 by a bracket 46. A pad 47 on the end of piston 48 engages the ground to stabilize the vehicle. A pair of hydraulic hoses 49 connect the stabilizer to the vehicle's hydraulic system, as will be explained. A limit switch LS-ST on one of the stabilizers indicates when its stabilizer pad 47 is in its uppermost position.

An internal combustion engine 50 is shown on the vehicle's left side. This engine provides power to a hydraulic pump 52. Starting power for the engine is provided by a battery 54 which also provides power for other vehicle components, such as a horn, headlights, parking and brake lights, and passenger compartment courtesy lights. A rotating beacon may also be provided as an option.

An operator's compartment 60 includes a seat rest 62, the steering wheel 36, a brake pedal 64 and an automobile type accelerator pedal 66. Also included in the area 60 is a control panel 68 containing hand controls for other functions of the vehicle, as will be explained.

Figure 11:
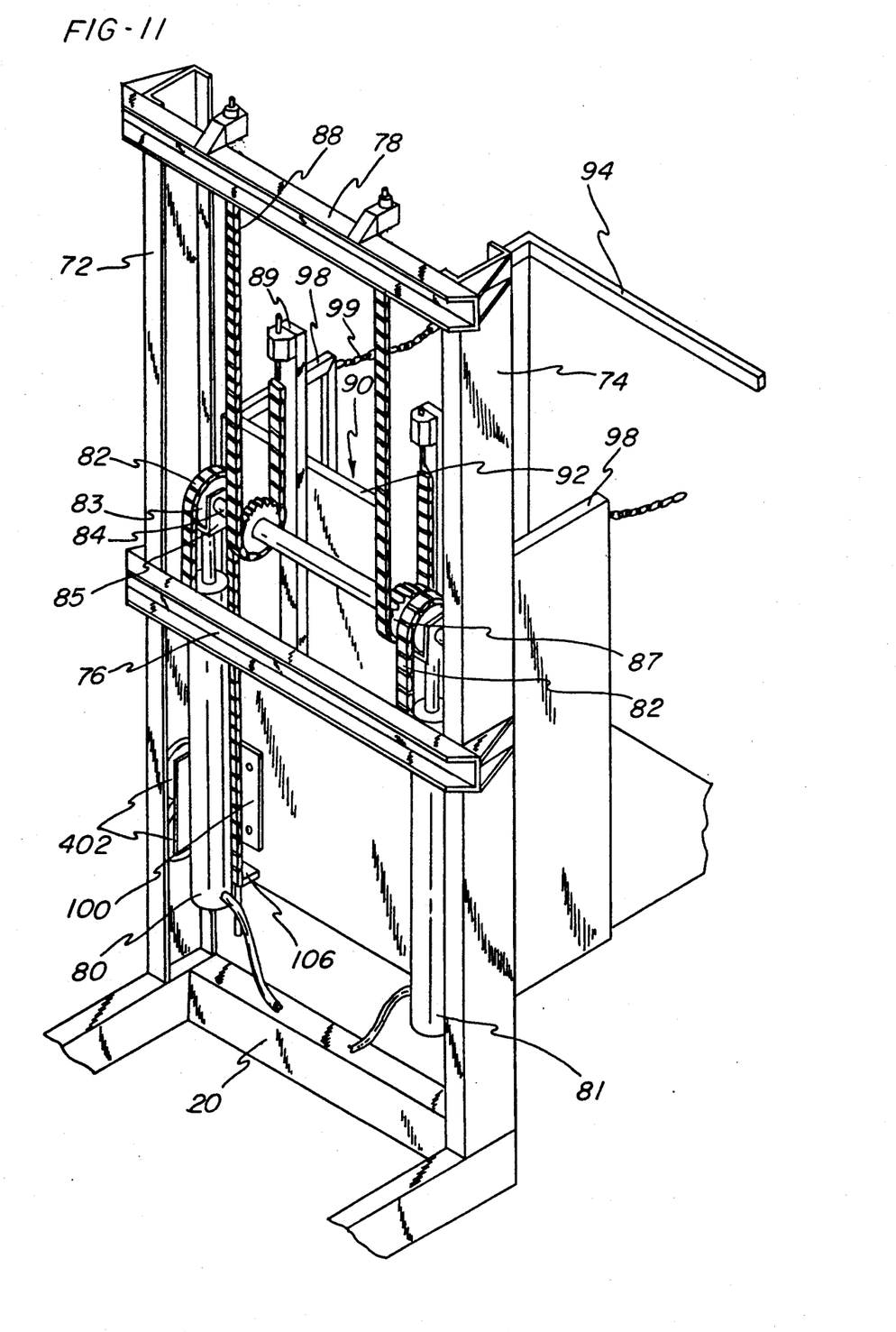
FIG. 11 is a perspective view of a platform lift mechanism.

A lift assembly means, shown generally at 70, is carried by the vehicle for moving a passenger and attendant from a lowermost position to an operator selectable upper position. As shown in FIG. 11, the lift assembly means includes a pair of vertical channel members 72 and 74 that are mounted to the frame 20 and, as shown in FIG. 1, a pair of cross members 76 and 78.

a pair of hydraulic lifting cylinders 80 and 81 are supported on cross member 76. Chains 82 have one end connected to the cross member 76, and extend over pulleys 83 supported for rotation on a shaft 84 passing through a clevis 85 attached to the movable piston in each cylinder. The other ends of the chains 82 are connected to a passenger compartment 90.

To counter any uneven distribution of weight on floor of the passenger compartment and to equalize the forces acting on the cylinders, a shaft 86 surrounds the shaft 84 and is provided with gears 87 fixed at each end thereof. Chains 88 extend from the cross arm 78, around the gears 87 and are attached to an arm 89 supported on the passenger compartment 90.

The passenger compartment 90, as shown in FIGS. 1, 3 and 11, includes a pair of side walls 92 and 94 and a floor 96. The interior surfaces of the walls may be cushioned to protect the passengers, and tie downs 95 are provided to secure the wheelchair during movement of the vehicle. The floor is also provided with a skid resistant surface. End members 98 are placed at each end of the side walls to form a partial end wall. The opening between the end members is wide enough for a boarding wheelchair easily to pass therebetween.

Figure 12:
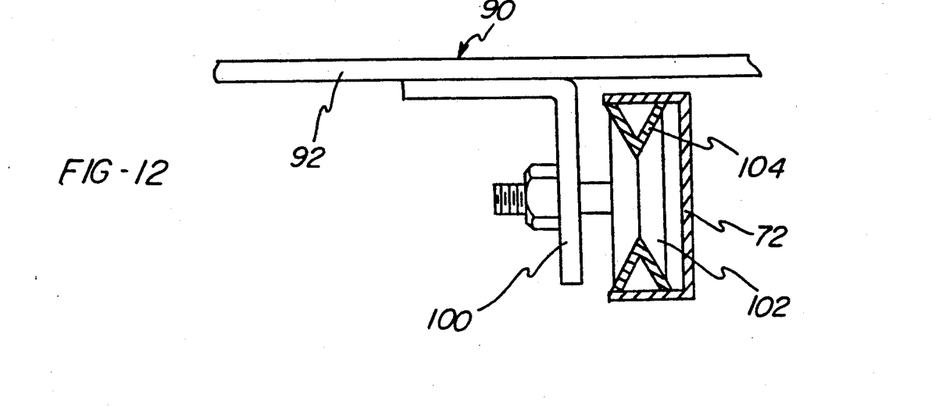
FIG. 12 is a detailed cross sectional view of a lift support column and a platform support roller.

The left hand side wall 92 faces the lift assembly means 70 and has secured thereto a pair of brackets 100. Each bracket includes a pair of spaced apart guide rollers 102 (FIG. 12) that engages "V" shaped guides 104 on the interior surface of the channel members 72 and 74. The ends of the chains 84 are attached to the wall 92 at 106. Thus, the passenger compartment is supported for vertical movement on the lift assembly means.

Figure 9:
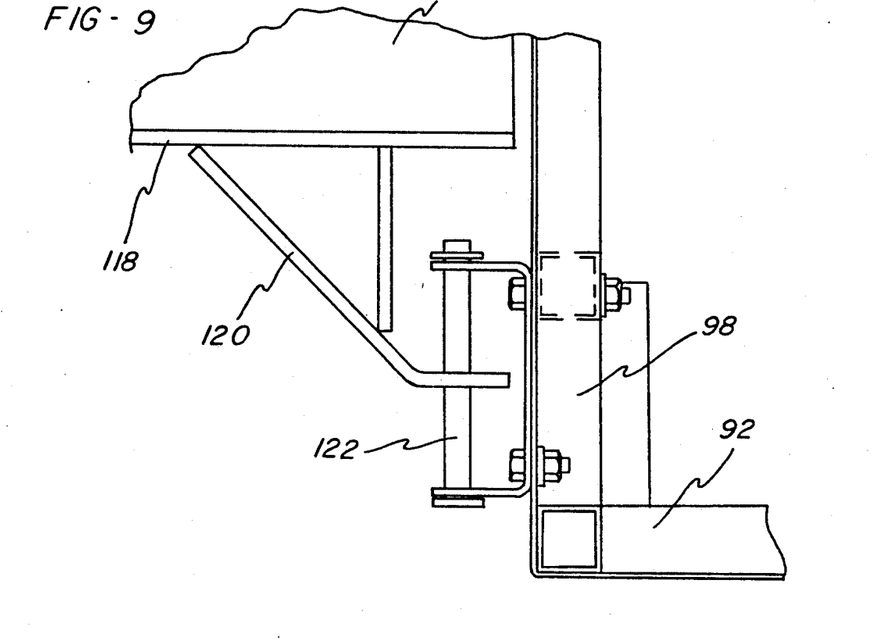
FIG. 9 is a detailed plan view of a ramp hinge.
Figure 10:
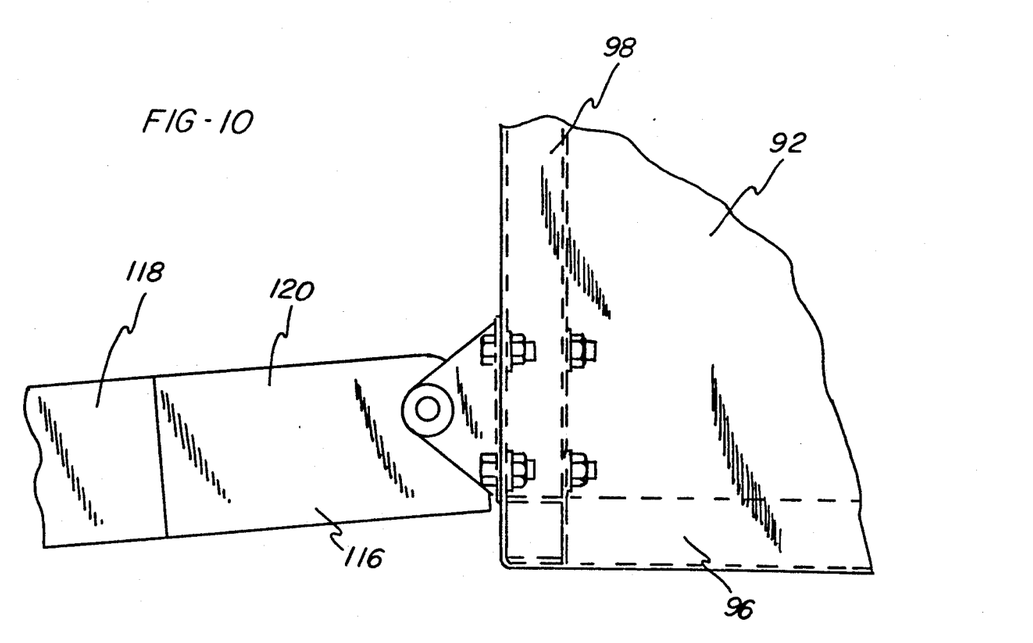
FIG. 10 is a detailed elevational view of the ramp hinge of FIG. 9.

Associated with the passenger compartment 90 are a first or rearward ramp 110 and a second or forward ramp 112. Each ramp includes a floor 116 and short vertical wall edge 118, as shown in FIGS. 9 and 10. The floors of the ramps are provided with skid resistant surfaces. A bracket or hinge 120 is welded to the floor which engages a hinge pin 122 secured to the end wall 98. As shown in FIG. 9, this arrangement permits limited horizontal or lateral movememt of the ramp, if needed, as shown by the arrow 124 in FIG. 2.

Figure 8:
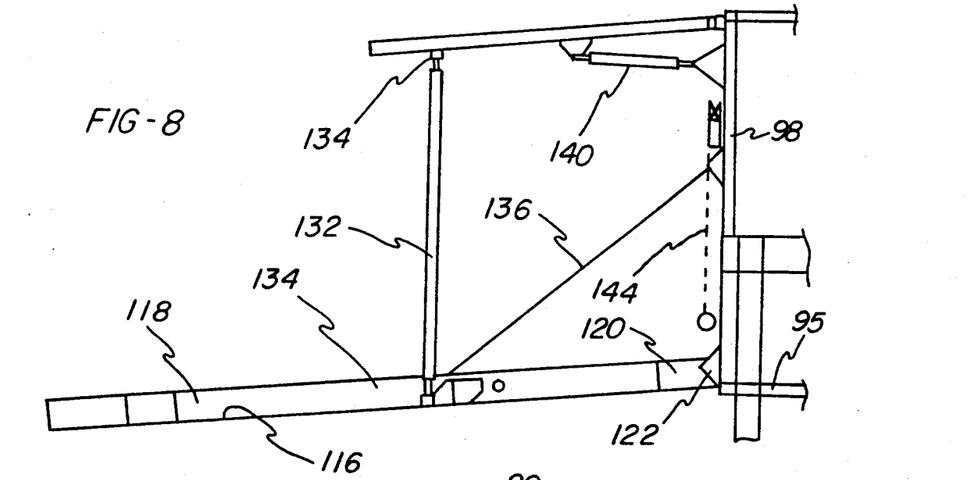
FIG. 8 is a detailed elevational view of a loading ramp.

Referring to FIG. 8, each ramp is provided with a pair of hand rails 130 hinged to the end wall 98, one of which is shown. A vertical support 132 extends between the end of the handrail and the ramp and is connected at each end by means of a ball joint 134. A cable 136 is connected between the ramp and the end wall 98 to prevent the ramp from descending below the position shown.

Since each ramp is movable from an upper or traveling position, as shown in FIG. 1, to a lower or loading position, as shown in FIG. 8, means are provided to assist the operator in raising the ramp against the force of gravity. A gas cylinder 140 of the type used in automobiles is attached between the hand rail 130 and the end wall 98 to provide a lifting force upwardly on the hand rail.

Since each ramp is provided with two lifting cylinders, one handed raising of the ramp is easily accomplished. Each ramp may be locked in its upper or traveling position by means of an automatically acting latch pin 144. The ramps thus serve the dual function of facilitating access to and from the platform and as closures or gates.

Figure 13:
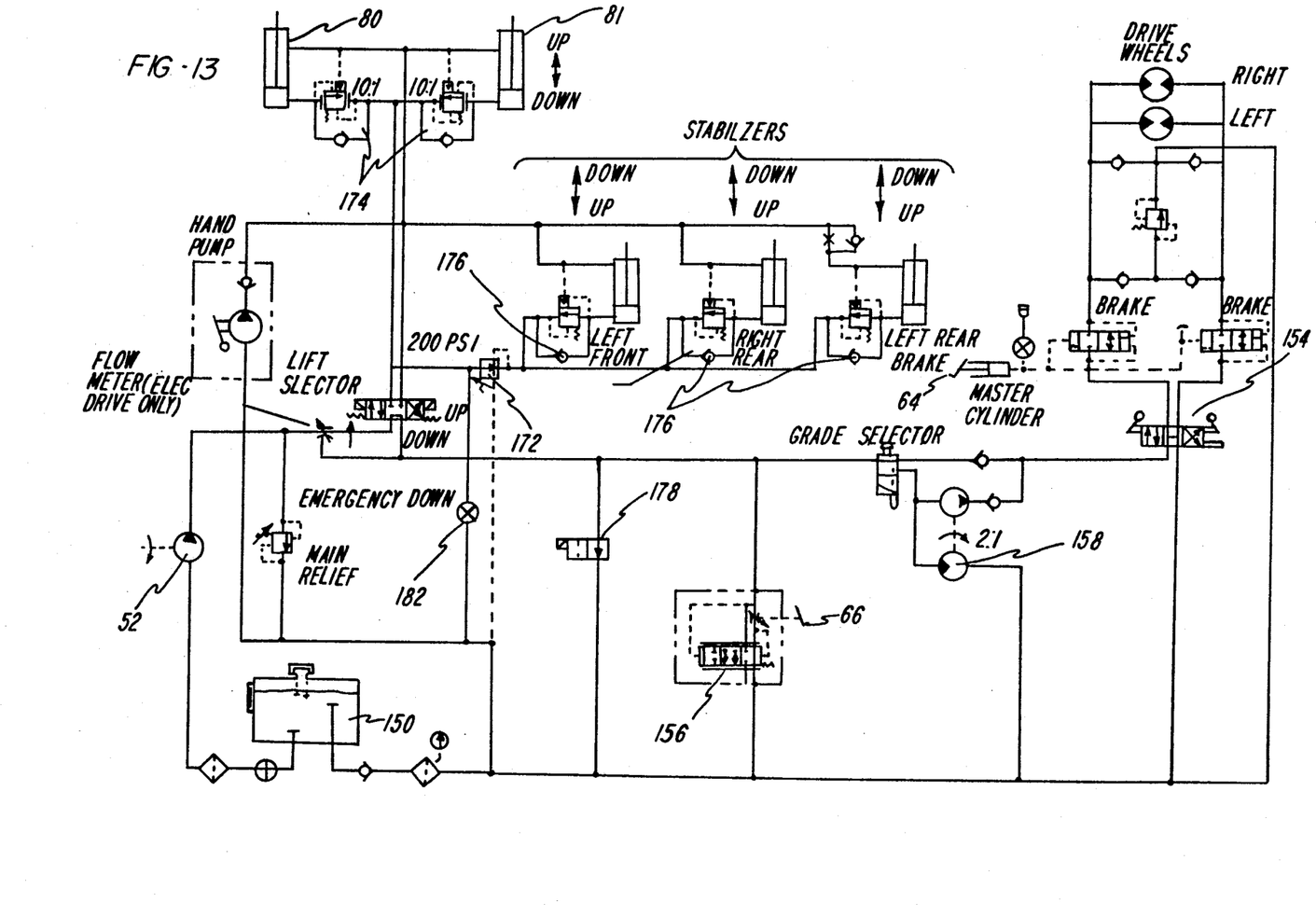
FIG. 13 is a schematic diagram of the hydraulic system providing motive and lifting power to the passenger access lift.

The hydraulic schematic diagram of FIG. 13 shows a preferred system for providing control over the vehicle thus described. Power to the main pump 52 is provided by the engine 50. Of course, an electric motor or other means could be used to provide a source of hydraulic pressure to the system. Hydraulic fluid from a reservoir 150 is sent through a grade selector 152 to a drive selector 154.

The drive selector 154 is provided with an operator controlled handle in the operator's compartment and is operable from a center or neutral position to either a forward or reverse position, thus sending hydraulic fluid to the wheel motors 38 in the appropriate direction to control the motion of the vehicle.

The speed of the vehicle is controlled by an accelerator pedal 66 connected to a valve 156. This valve either bypasses all flow to the motors 38, when the accelerator is up, or permits full flow when the accelerator pedal is fully down. The grade selector 152 diverts hydraulic flow through a gear intensifier 158 whenever it is necessary to increase torque on the motors 38, such as when climbing a grade. The gear intensifiers are not normally used when operating on level ground.

The vehicle may be braked by operating the brake pedal 64, which in turn controls brake valves 160 in the hydraulic lines to the motors 38.

When the operator wishes to raise the passenger compartment, a momentarily actuated weather resistant toggle switch 194 (FIG. 14) in the operator's compartment is moved to control a solenoid actuated lift selector valve 170. An electrical interlock is provided between the toggle switch and a sensor switch associated with parking brake actuator 171 to prevent the raising of the platform if the parking brake is not set.

When the toggle switch is moved to the UP position, and the parking brake is set, the first action taken will be to cause stabilizers 40, 42 and 44 to place their pads 47 firmly in contract with the ground. A pressure reducer 172 insures that the stabilizers will not raise the vehicle off the ground, but sufficient pressure is provided to prevent the vehicle from rocking as the passenger compartment is raised.

Once the stabilizers have fully extended, sufficient pressure will be available to operate the lift cylinders 80 and 81. When the passenger compartment has reached its desired height, the operator will release the toggle switch 194, allowing it to return to its neutral position. This will cause the lift selector 170 also to return to its neutral position. Counter balance valves 174 and 176 act as safety check valves to maintain the lift cylinders and the stabilizers in their present position.

Moving the lift selector toggle switch 194 to the DOWN position will first cause the lift cylinders to retract, lowering the platform, and then cause the stabilizers to retract. One of the stabilizers is provided with a limit switch LS-ST (FIG. 7) to indicate when it has reached its fully retracted position. This limit switch controls the operation of a drive safety valve 178 which will be fully open whenever the stabilizers are not fully retracted, thus preventing the movement of the vehicle by diverting all hydraulic fluid flow from the drive motors 38.

A hand pump 180 may be used to lower the passenger compartment in the event the main pump 52 is inoperative. Emergency Down valve 182 will be opened to provide the necessary circulation path for the hydraulic fluid when the hand pump is used. Moving the vehicle by hand or by towing without the pump motor operating is possible whenever the stabilizers are retracted and if the drive selector 154 is either in the neutral or center position or in the direction of desired travel.

Figure 14:
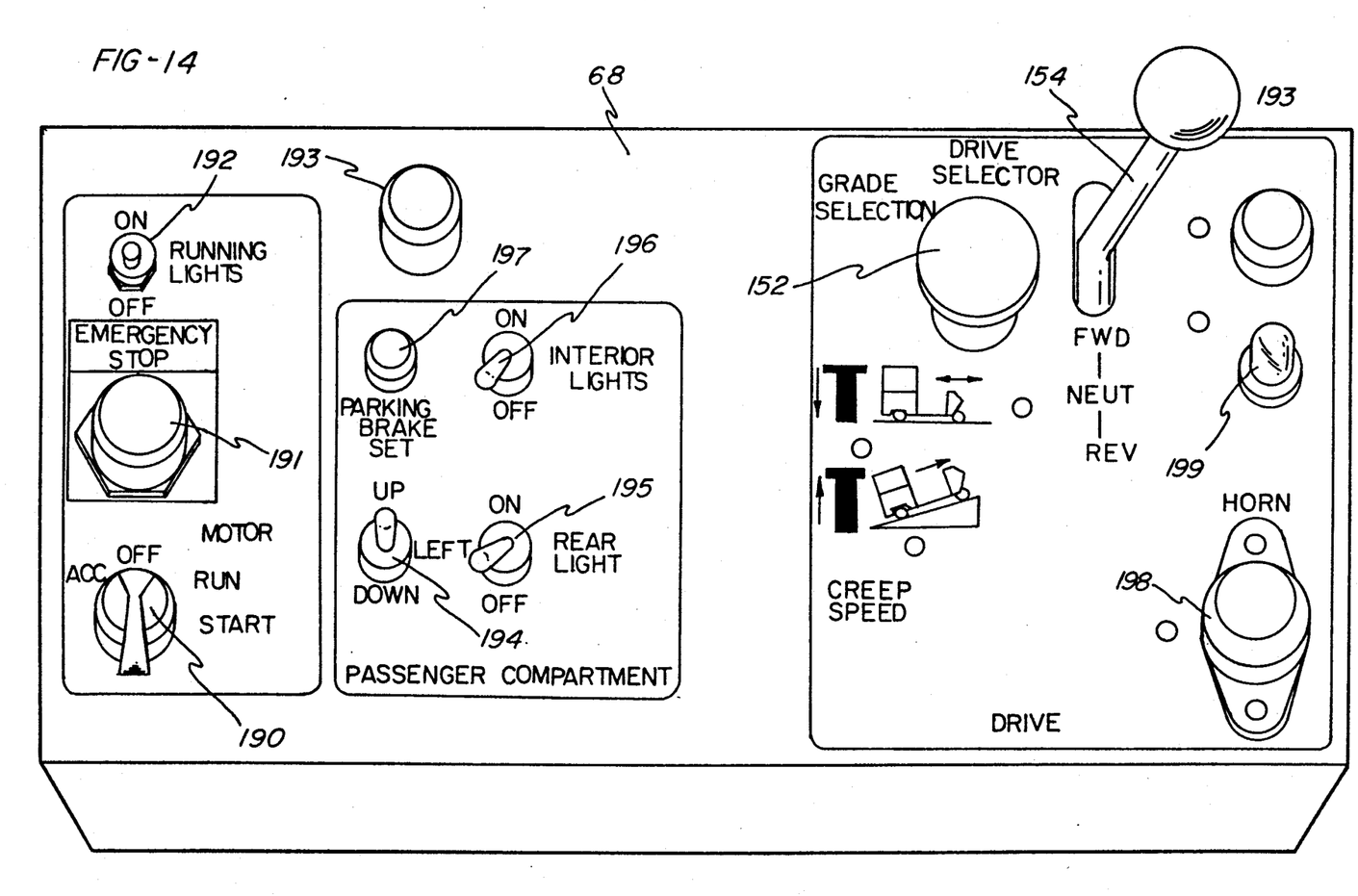
FIG. 14 is a perspective view of a control panel in the operator's compartment.

The operator's control panel 68 is shown in FIG. 14. This panel is located in the operator's compartment 60 and includes motor control switch 190 having an off, run, start and accessory position, similar to a conventional automobile switch. An emergency stop switch 191 removes power to the motor whenever the operator presses on the red mushroom shaped button. A switch 192 controls the vehicle's running lights, such as head and tail lights and instrument panel lights 193.

The passenger compartment section of the panel 68 includes a weather proof toggle switch 194 which controls the solenoid actuated lift selector 170. The passenger compartment interior lights are controlled by switch 195 and the rear ramp courtesy lights are controlled by switch 196. Indicator lamp 197 shows when the parking brake is set.

Figure 15A:
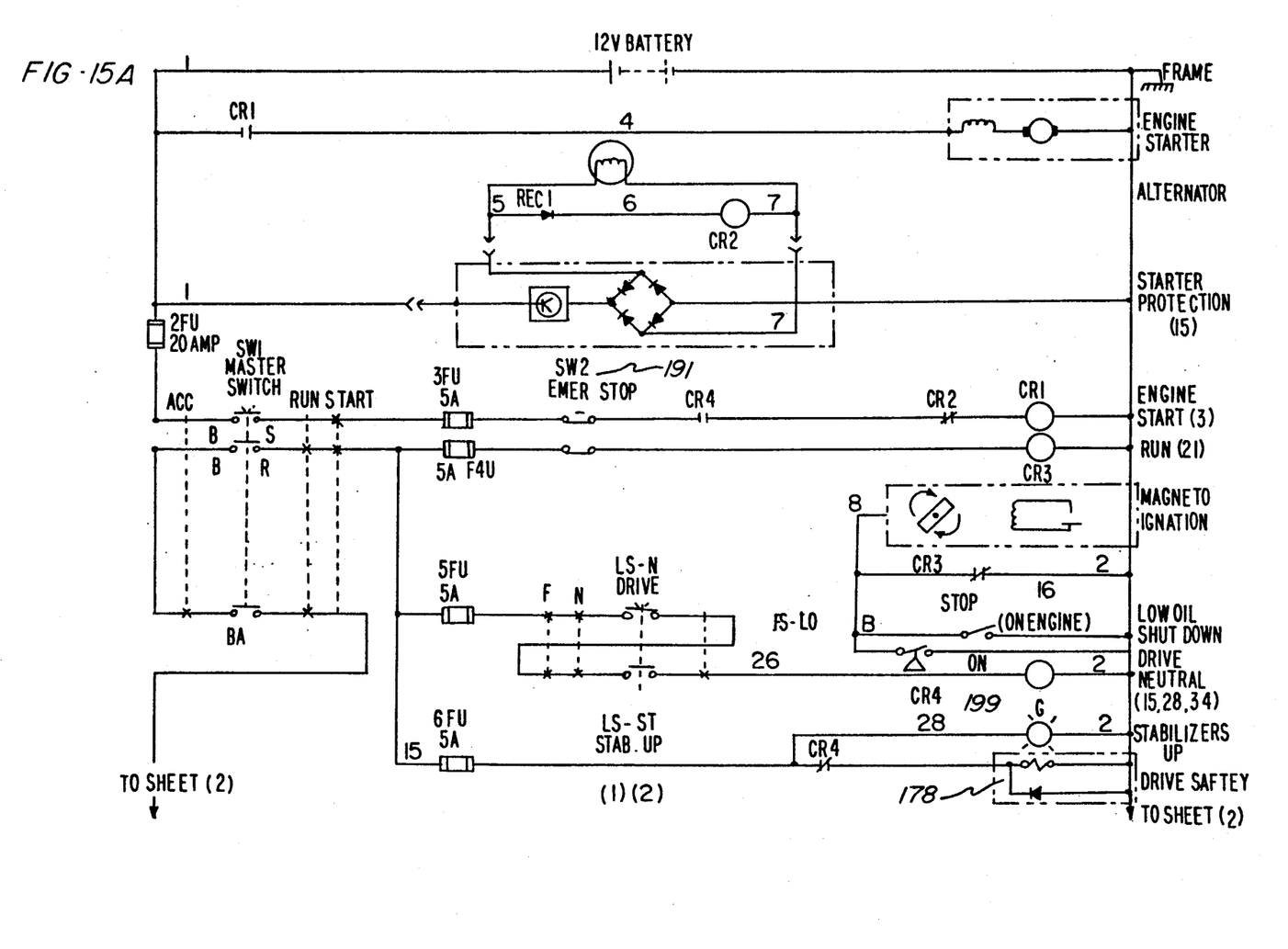
FIGS. 15A and 15B together comprise an electrical schematic diagram of the vehicles electrical system.
Figure 15B:
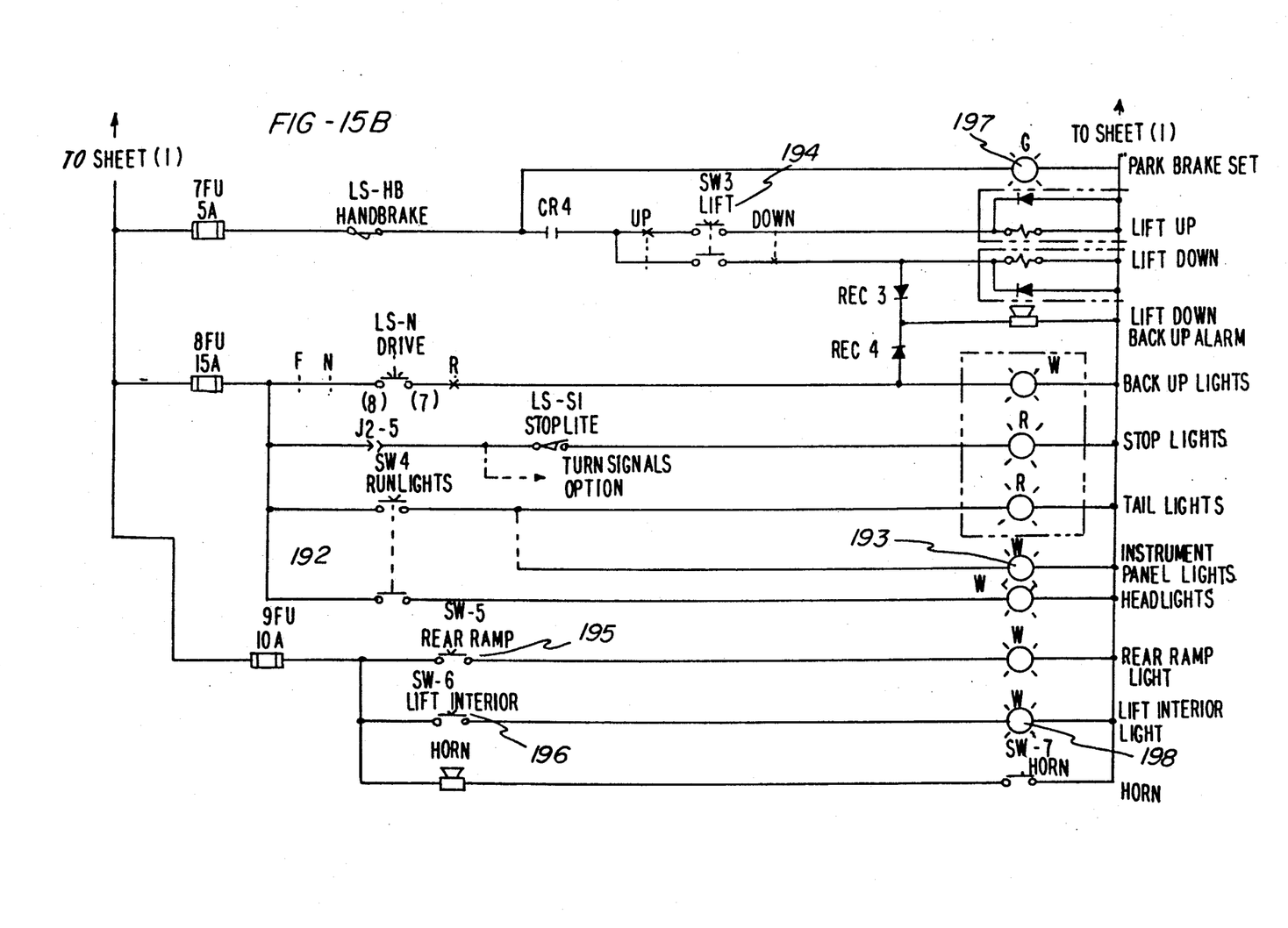

Drive controls are on the right side of the panel 68 and include the grade selector 152, drive selector 154, and horn button 198. An indicator lamp 199 shows when the stabilizers are in the up or retracted position. The electrical schematic diagrams of FIGS. 15A and 15B show the electrical components of the vehicle.

Figure 4:
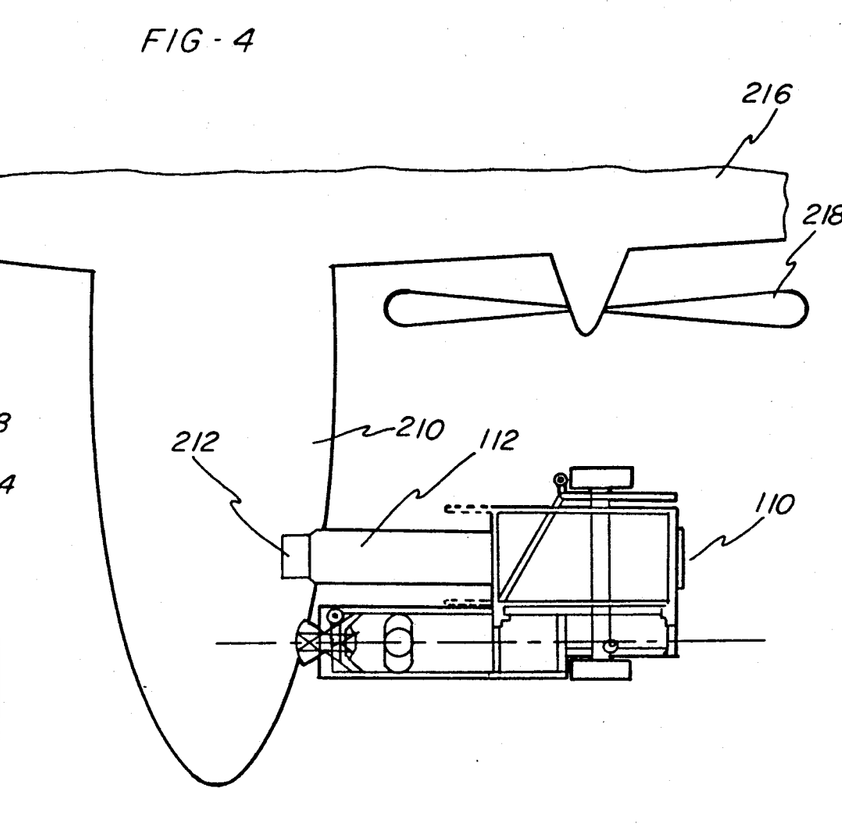
FIG. 4 is a plan view showing the passenger access lift of this invention parked adjacent an aircraft.
Figure 5:
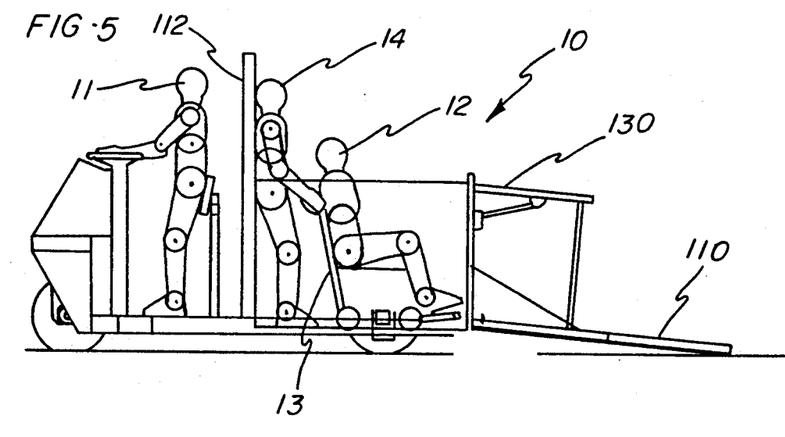
FIG. 5 is a side elevational view of a passenger access lift, taken along lines 5—5 of FIG. 2, with the lift in the lowermost position, the forward ramp in the traveling position and the rear ramp lowered or in the loading position.
Figure 6:
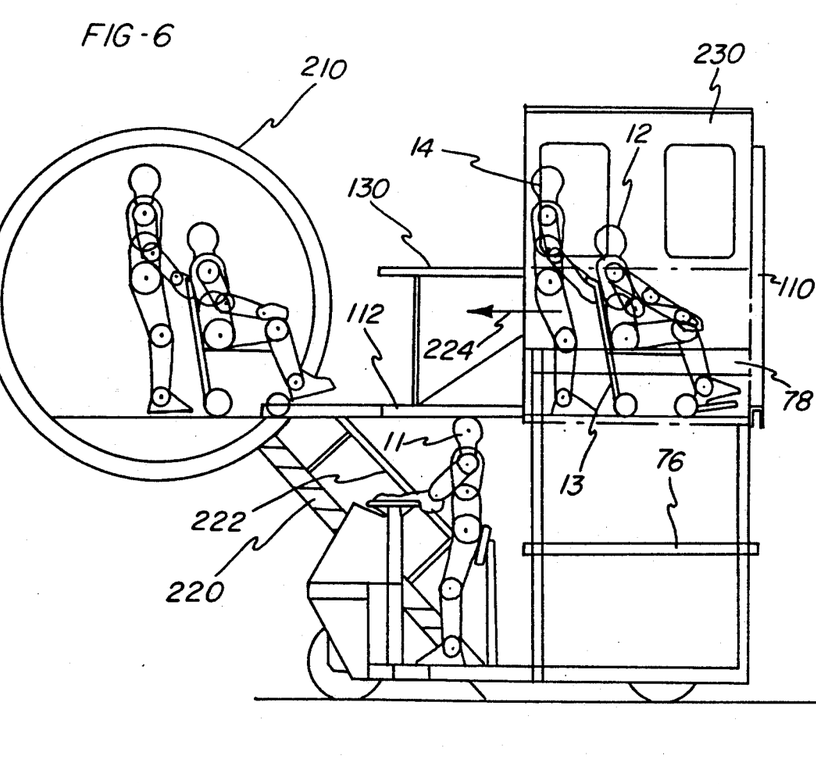
FIG. 6 is a side elevational view of a passenger access lift adjacent an aircraft with the lift in an elevated position and the front loading ramp lowered.

Referring now to FIGS. 4-6, the mode of operation of the passenger access lift will be described. Usually, the rear ramp will be lowered to the position shown in FIG. 5 where a disabled passenger 12 and an attendant 14 may be moved up the ramp and into the passenger compartment 90 of the vehicle. The disable passenger is typically seated in a boarding wheelchair 13 and is preferably moved in to the passenger compartment facing backwards. The rear ramp 110 will then be raised and locked in its traveling position and the vehicle 10 then moved to the area where elevated boarding will occur.

As shown in FIG. 4, the passenger access lift 10 will move directly toward a door 212 of an aircraft 210, parallel to the wing 216 and propeller 218. Of course, either a front or rear door or the aircraft may be approached in this manner. As the operator guides the vehicle toward the door, the operator's compartment 60 will pass to the left of and adjacent any stairway 220 extending from the aircraft. By locating the operator in the forward part of the vehicle and adjacent the forward ramp, placing the vehicle in proper position for extending the ramp 112 into the door 212 of the aircraft 210 is made easier.

At this time, the operator will set the parking brake 171 (a mechanical brake), which will be indicated by parking brake light 197. When the driver operates the lift selector toggle 194 to the UP position, lift selector valve 170 is be actuated. This action will automatically activate the stabilization system by lowering the stabilizer pads 47 into positive contact with the ground.

After the stabilizers 40, 42 and 44 are in position, the passenger platform will raise to a height judged by the operator to be sufficient. The driver or the attendant will then lower the front ramp 112 into the door 212 of the aircraft, between any handrails 222 associated with the aircraft's stairway 220. The ramp's handrails 130 will automatically extend. If necessary, the ramp 112 may be aligned laterally to position it squarely in the door and between the handrails 222. The attendant then removes the wheelchair constraints 95 and safety chain 99 (FIG. 11) and pulls the passenger across the ramp 112 in the direction of the arrow 224 to the elevated destination, as shown in FIG. 6. There are a few circumstances where the passenger will be moved onto an aircraft facing forward, such as when loading through a rear door and where the space in the aircraft does not permit turning the passenger around.

Moving a passenger from the elevated door of an aircraft to the terminal will be accomplished in a similar manner, but the passenger will normally be pulled by the attendant into the vehicle and will end up facing forward of the vehicle, opposite that shown in FIG. 6. The passenger and attendant will then be lowered, the stabilizers retracted, and the vehicle moved to the terminal where the passenger will be off loaded on ramp 110.

A cover or canopy 230 may be provided for the passenger compartment, if desired, as illustrated in FIG. 6.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claim.

What is claimed is:

1. A self-powered, three wheel, steerable vehicle for transporting a mobility impaired passenger in a boarding wheelchair and an attendant between a first location and the entrance to an aircraft at a second location at a different elevation, the aircraft having stairs with handrails descending from the entrance thereinto, said vehicle comprising a frame assembly including a single forward component offset to one side so as to be positionable to one side of any stairs descending from the aircraft, and a rear component, a first wheel mounted on the forward component of said frame assembly, and a pair of wheels mounted on said rear component of said frame assembly, an operator's compartment mounted on and located at the offset forward end of said frame assembly, a lift assembly mounted on said frame assembly for movement from a lowermost position to an operator selectable upper position, a passenger compartment carried by said lift assembly, and a boarding ramp located at the front end of said passenger compartment for placement into the aircraft entrance to provide a bridge between said passenger compartment and the aircraft and over the stairs and between the handrails of the aircraft whereby a passenger in a boarding wheelchair may be moved from the passenger compartment onto the aircraft by an attendant.

2. The vehicle of claim 1 further including a rear ramp placed at the rear end of said passenger compartment to provide a bridge between the passenger compartment and the first location.

3. The vehicle of claim 2 wherein said boarding and rear ramps are movable from a first or loading position to a second or traveling position where said ramps serve as a closure to said passenger compartment.

4. The vehicle of claim 1 further including
means for stabilizing said vehicle when said lift assembly is in other than its lowermost position.

5. The vehicle of claim 4 further including a parking brake for holding the vehicle stationary during loading and unloading procedures.

6. The vehicle of claim 5 further including interlock means for preventing the operation of said lift assembly unless said parking brake is set and said stabilizing means is actuated.

7. The vehicle of claim 4 wherein said stabilizing means do not lift the vehicle off the ground.

8. The vehicle of claim 1 wherein said forward wheel is steerable to permit accurate placement of said vehicle and wherein said rearwardly placed wheels are powered wheels.

9. The vehicle of claim 2 wherein each ramp includes
means for hinging said ramp to said passenger compartment, and
a pair of gas cylinders attached between said ramp and said passenger compartment for assisting the raising of said ramp to its traveling position.

10. The vehicle of claim 1 further including hydraulic means for supplying power to said lift assembly.

11. The vehicle of claim 1 further including hydraulic means for supplying motive power to move the vehicle.

12. A method for transporting a mobility impaired passenger in a boarding wheelchair between a first location and an entrance to an aircraft at second location where the aircraft has stairs with handrails descending from the entrance, the method comprising the steps of
operating a transport vehicle having only three wheel assemblies from an operator's compartment located at an offset forward end of the vehicle,
moving a passenger into a passenger compartment carried by the transport vehicle by moving the boarding wheelchair onto a locating ramp and then into the passenger compartment,
raising the loading ramp to provide an end closure for the passenger compartment,
moving the transport vehicle directly toward said entrance of the aircraft with the operator's compartment positioned to one side of the aircraft stairs,
raising the passenger compartment to approximately the same elevation as the entrance of the aircraft,
placing a boarding ramp into the entrance of the aircraft, over the stairs and between any handrails associated with the stairs, and
boarding the passenger by moving the boarding wheelchair from the passenger compartment and over the boarding ramp into the aircraft.

13. The method of claim 12 further including the step of extending stabilizers to steady the vehicle prior to raising the passenger compartment to approximately the same elevation as the aircraft entrance.

14. The method of claim 13 wherein the step of extending the stabilizers includes lowering stabilizer pads into firm contact with the ground without raising the transport vehicle off the ground.

* * * * *